(12) United States Patent
Wu et al.

(10) Patent No.: US 11,745,431 B1
(45) Date of Patent: Sep. 5, 2023

(54) RAPID DLP 3D PRINTING CONTROL PARAMETER OPTIMIZATION METHOD COMBINING CONTINUOUS AND LAYERED MOLDING

(71) Applicant: BEIJING UNIVERSITY OF TECHNOLOGY, Beijing (CN)

(72) Inventors: Lifang Wu, Beijing (CN); Lidong Zhao, Beijing (CN); Zening Men, Beijing (CN); Yandong Li, Beijing (CN); Feng Yang, Beijing (CN); MingLi Xiang, Beijing (CN); Zun Li, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/868,653

(22) Filed: Jul. 19, 2022

(30) Foreign Application Priority Data

May 13, 2022 (CN) .......................... 202210540382.1

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/124* (2017.08); *B33Y 10/00* (2014.12); *B33Y 50/02* (2014.12)

(58) Field of Classification Search
None
See application file for complete search history.

(56) References Cited

U.S. PATENT DOCUMENTS

2021/0291261 A1* 9/2021 Korneev ................. G06F 30/27
2022/0193988 A1* 6/2022 Walker ................... B33Y 10/00

FOREIGN PATENT DOCUMENTS

CN 111112621 B * 8/2021 ............. B22F 10/00
JP 2020082389 A * 6/2020 ............. B29C 64/00

OTHER PUBLICATIONS

Li et al, Theoretical prediction and experimental validation of the digital light processing (DLP) working curve for photocurable materials, Additive Manufacturing, vol. 37, Jan. 2021, 101716 (Year: 2021).*

(Continued)

*Primary Examiner* — Yung-Sheng M Tsui
(74) *Attorney, Agent, or Firm* — J.C. PATENTS

(57) ABSTRACT

A rapid DLP 3D printing control parameter optimization method combining continuous and layered molding includes the following steps: confirming the maximum printable distance of each slice by analyzing the printable area of the model slice. The liquid-liquid interface printing scene was further established, and the flow behavior of the resin between the printed object and the fluorinated oil after printing a layer of slices was simulated and recorded. Next, determine the printing mode of the current slice by slicing the maximum printable distance and numerical simulation model. Then, based on Poiseuille flow, Jacobs working curve and Lambert-Beer law, the resin curing time of continuous and layered printing, the maximum filling distance of continuous printing, the best lifting distance of layered printing, and the corresponding printing platform lifting of the two methods are expressed speed. Finally, camera monitoring is used to determine the print origin before printing starts. This method can achieve fast printing of any model by obtaining the optimal control parameters, while being portable and printable.

7 Claims, 4 Drawing Sheets

(51) Int. Cl.
    *B33Y 10/00*     (2015.01)
    *B29C 64/124*     (2017.01)

(56) References Cited

OTHER PUBLICATIONS

"Continuous liquid interface production of 3D objects", Science, vol. 347 Issue 6228, pp. 1349-1352, Mar. 20, 2015.

"Bioinspired Ultra-Low Adhesive Energy Interface for Continuous 3D printing", Research, vol. 2018, Article ID 4795604, 10 pages, https://doi.org/10.1155/2018/4795604.

"Rapid, large-volume thermally controlled 3D printing using a mobile liquid interface", Science 366, 360-364 (2019) Oct. 18, 2019.

"Model guided DLP 3D printing for solid and hollow structure", by Zechao Liu et al., Downloaded from IEEE Xplore, 978-1-6654-4112-4/21 ©2021 IEEE.

"Model-Guided 3D Printing Combining Continuous and Layer-Wise Manufacturing", Journal of Integration Technology, vol. 11, No. 1. pp. 1-9, Jan. 2022.

\* cited by examiner

RAPID DLP 3D PRINTING CONTROL PARAMETER OPTIMIZATION METHOD COMBINING CONTINUOUS AND LAYERED MOLDING

CROSS-REFERENCE TO RELATED APPLICATION

This application claims priority to Chinese application No. 202210540382.1, filed on May 13, 2022, the content of which is hereby incorporated by reference in its entirety and made a part of this specification.

TECHNICAL FIELD

The invention relates to computational fluid dynamics, intelligent control and image processing technology. By simulating the flow behavior of the resin and using the relevant laws of computational fluid dynamics to express the key control parameters of digital light processing (DLP) 3D, the optimization of fast DLP 3D printing control is realized, and the printing efficiency and model adaptation range are improved.

BACKGROUND TECHNIQUE 3D printing technology refers to a device that uses 3D printing technology to produce real three-dimensional models. The basic principle is to use special consumables (glue, resin or powder, etc.) to form a 3D entity by bonding each layer of powder through the deposition of a binder according to a three-dimensional model pre-designed by a computer. At present, a variety of different 3D printing forming processes have been formed, such as Stereolithography (SLA), Laminated Object Manufacturing (LOM), Fused Deposition Modeling (FDM), Selective Laser Sintering (SLS), 3D Printing (3DP), DLP 3D printing, etc. But for now, FDM and other technologies have poor precision, need to continuously melt the material filament and wait for the material to solidify, and the overall molding speed is slow. Digital Light Processing (DLP) 3D printing technology uses DLP optical machine or projector as the light source, and adopts the method of layered printing. The printing platform first rises and then descends, leaving the thickness of a slice layer with the resin tank. Layer-by-layer exposure can be completed, and the printing speed has been faster than other printing methods.

With the further increase in the production demand for DLP 3D printing technology, the layered molding method can no longer meet the market's requirements for printing speed. In recent years, a series of continuous forming technologies for DLP 3D printing have emerged. Including the continuous interface production technology (CLIP) based on oxygen-inhibited curing invented by the University of North Carolina in 2015. In 2018, Song Yanlin's team from the Institute of Chemistry, Chinese Academy of Sciences invented an ultra-low adhesion manufacturing interface inspired by the surface smoothness of Nepenthes. In 2019, Walker D A and others from Northwestern University in the United States invented a large-scale fast DLP 3D printing method based on liquid-liquid interface. All of the above methods can increase the speed of DLP 3D printing, but limited by the leveling speed of the photosensitive resin, the range of applicable models is limited.

In 2021, Liu et al. based on the ultra-low adhesion interface designed by Song Yanlin, by combining delamination with continuous printing, and proposing the key parameter of the maximum resin filling distance during continuous printing, which increases the range of model adaptation. In 2022, Li Y D et al. based on Walker D A's liquid-liquid interface printing method, and proposed a 3D printing method combining model-guided layering and continuous. Based on the method of Liu et al., the optimal lifting height of layered printing is proposed to reduce the layered printing time, and the method proposed by Li Y D et al. can be adapted to most models. However, the parameters are determined by experiments and the efficiency is not high, which is greatly affected by the environment, and the parameters that can be optimized are limited. These have seriously affected the application of DLP 3D printing technology.

SUMMARY OF THE INVENTION

The invention provides a rapid DLP 3D printing control parameter optimization method combining continuous and layered molding. The liquid-liquid interface printing scene was simulated by the Volume of Fluid (VoF) method, and the flow behavior of the resin between the printed object and the fluorinated oil after printing a layer of slices was recorded. Then based on Poiseuille flow, Jacobs working curve and Lambert-Beer law are used to express resin curing time for continuous and layered printing, maximum fillable distance (MFD) for continuous printing, optimal lift distance (OLH) for layered printing and The control parameters of the printing platform lifting speed corresponding to the two methods. By adopting a proposed method for optimizing the control parameters of rapid DLP 3D printing that combines continuous and layered molding, rapid printing of any model can be achieved by obtaining the optimal control parameters.

In order to solve the above-mentioned technical problems, the embodiment of the present invention adopts the following technical solutions:

A rapid DLP 3D printing control parameter optimization method combining continuous and layered molding, including the following steps:

Step 100: Slice the three-dimensional model to be printed to obtain the slice number i. Determine the printable area of each slice, and calculate the maximum value $D_{MAX}[i]$ of the shortest distances from all points in the printable area of each slice to its boundary points;

Step 200: Based on the standard solver of the open source computational fluid dynamics (CFD) software OpenFOAM. And according to the liquid-liquid two-phase flow printing scene of resin-fluorinated oil, the VoF model is used to establish a numerical simulation model;

Step 300: Establish a Cartesian coordinate system according to the printing scene. According to the $D_{MAX}[i]$ obtained in step 100 and the numerical simulation model established in step 200, the Poiseuille flow characteristic analysis is used to obtain the print mode of each slice;

Step 400, according to the slice printing mode obtained in step 300, obtain slices printed in a continuous manner Calculate the rising speed of the continuous forming printing platform according to the Lambert-Beer law and write it into the printing configuration file;

Step 500: According to the slice printing mode obtained in step 300, obtain slices printed in a layered manner Calculate the relationship between its resin leveling time and other control parameters. And according to Jacobs work curing curve to obtain the expression of layered resin curing time, and write the obtained control parameters into the printing configuration file;

Step 600: Before printing starts, use camera monitoring to determine the printing origin, and then complete the printing according to the printing configuration file.

Among them, slice the three-dimensional model to be printed to obtain the slice number i. Determine the printable area of each slice, and calculate the maximum value $D_{MAX}[i]$ of the shortest distances from all points in the printable area of each slice to its boundary points. Step 100 includes: Slice the three-dimensional model to be printed, and at this time, only the pixel points with a grayscale of 255 are the pixels to be exposed. Take the area with a grayscale value of 255, which is the printable area of the slice;

Detect the printable areas of different slices. Determine the four points of the upper left, lower left, upper right and lower right corners. Connect them as a closed area S. At the same time, obtain the non-edge points that are closest to the center of the printable area. Pixel point. Record these distance values and compare them to obtain the maximum value $D_{MAX}[i]$ of the minimum distance corresponding to different slice i respectively.

Among them, based on the standard solver of the open source computational fluid dynamics (CFD) software Open-FOAM. And according to the liquid-liquid two-phase flow printing scene of resin-fluorinated oil, the VoF model is used to establish a numerical simulation model. Step 200 includes:

According to the standard solver of the open source CFD software OpenFOAM. And adopt the VoF model to establish a liquid-liquid two-phase flow printing scene including resin tank, printing platform, printing object, resin and fluorinated oil;

At the same time, set the resin tank, printing platform and printing object to rigid material. The boundary of the resin tank in contact with the fluorinated oil and resin is set to the solid wall boundary. The printing platform, the surface of the printing object in contact with the resin and fluorinated oil is set to linear Slip boundary. No-slip boundary between resin and fluorinated oil.

Among them, establish a Cartesian coordinate system according to the printing scene. According to the $D_{MAX}[i]$ obtained in step 100 and the numerical simulation model established in step 200, the Poiseuille flow characteristic analysis is used to obtain the print mode of each slice. Step 300 includes:

The resin has the same flow characteristics in any direction in the printing model and the fluorinated oil gap, and a Cartesian coordinate system is established according to the printing scene;

The resin flows in the gap between the printing model and the fluorinated oil, and its Reynolds number is less than 1. It conforms to the laminar flow motion law between the plates and conforms to the Poiseuille flow. There are N-S equations:

$$\frac{d^2u}{dy^2} = \frac{1}{\mu_1}\frac{dp}{dx} \tag{1}$$

The origin of y is the interface between the fluorinated oil and the resin, indicating the distance from the interface. The origin of x is the interface between the fluorinated oil and the resin perpendicular to the edge of the printed object, indicating the distance of resin filling. At the same time, there is a boundary condition:

$$u|_{y=H_s}=u_s, \ u|_{y=0}=0 \tag{2}$$

where u is the maximum speed of the resin moving in the x-axis. $u_s$ is the slip speed. $H_s$ is the height of the printing platform. dp/dx is the pressure gradient. $\mu_1$ is the viscosity of the resin. The integral of formula (1) is:

$$u = \frac{1}{2\mu_1}\frac{dp}{dx}y^2 + C_1 y + C_2 \tag{3}$$

Here $C_1$ and $C_2$ are constants. By substituting the boundary condition equation (3) into equation (1), then can get:

$$C_1 = \frac{u_s}{H_s} - \frac{1}{2\mu_1}\frac{dp}{dx}H_s \tag{4}$$

$$C_2 = 0 \tag{5}$$

$$u = \frac{1}{2\mu_1}\frac{dp}{dx}(y^2 - H_s \times y) + \frac{u_s}{H_s}y \tag{6}$$

According to the linear slip settings of the scene, it can get:

$$u_s = D_s \frac{du}{dy}\bigg|_{y=H_s} \tag{7}$$

Where $D_s$ is the slip length, according to formula (1) (4) (7) can be obtained:

$$u_s = \frac{1}{2\mu_1}\frac{H_s^2 D_s}{H_s - D_s}\frac{dp}{dx} \tag{8}$$

$$u = \frac{1}{2\mu_1}\frac{dp}{dx}\left(y^2 + \frac{2H_s D_s - H_s^2}{H_s - D_s}y\right) \tag{9}$$

According to formula (9), the volume flow Q between the printing model with width W and the fluorinated oil can be obtained as:

$$Q = W\int_0^{H_s} u\,dy = \frac{WH_s^3(4D_s - H_s)}{12\mu_1(H_s - D_s)}\frac{dp}{dx} \tag{10}$$

Then the average flow rate of the photosensitive resin is:

$$U_{av} = \frac{Q}{WH_s} = \frac{H_s^2(4D_s - H_s)}{12\mu_1(H_s - D_s)}\frac{dp}{dx} \tag{11}$$

At time $t_1$ when the platform rises, there is a relationship between the resin filling distance $L_r$ and the time variable t in one direction:

$$\begin{cases} L_r = \int_{t=0}^{\tau=t_1} \frac{H_s^2(4D_s - H_s)}{12\mu_1(H_s - D_s)} \frac{dp}{dx} * t\, dt \\ H_s = v_m * t \end{cases} \quad (12)$$

$v_m$ is the speed of the printing platform during the rising process. $t_1$ is the resin filling time when the filling distance is $L_r$. This is the continuous printing resin filling time;

The boundary between continuous printing and layered printing needs to determine the maximum filling distance of the continuous printing resin. This distance needs to be less than $D_{MAX}[i]$. Then the gap left after the printing platform is raised within the time $1/f_n$ of single-frame playback needs to be supplemented Completely. At the same time, it is ensured that the resin filling the gap can be completely cured before the next frame of image is played. And the printing platform rises slowly in continuous printing. The combination formula (12) has:

$$\begin{cases} D_{MAX}[i]' = \int_{t=0}^{\tau=\frac{1}{f_n}} \frac{H_s^2(4D_s - H_s)}{12\mu_1(H_s - D_s)} \frac{dp}{dx} * t\, dt \\ H_s = v_m * \frac{1}{f_n} \end{cases} \quad (13)$$

The maximum filling distance of continuous printing resin can be obtained, the corresponding $D_{Max}[i]'$:

$$D_{MAX}[i]' = \frac{v_m^2}{f_n^4} \cdot \frac{1}{C_3} \cdot \frac{1}{24\mu_1} \left|\frac{dp}{dx}\right| \quad (14)$$

Therefore, if the slice's $D_{MAX}[i] > D_{MAX}[i]'$, the slice is printed by layered molding. If the slice's $D_{MAX}[i] \leq D_{MAX}[i]'$, it is printed by continuous molding.

According to the slice printing mode obtained in step 300, take the slices printed in continuous mode. Calculate the rising speed of the continuous forming printing platform according to the Lambert-Beer law, and write it into the printing configuration file. Step 400 includes:

Taking the slices of continuous molding and printing obtained in step 300, according to the Lambert-Beer law:

$$P(z) = P_0 \cdot e^{-z/D_p} \quad (15)$$

where $P(z)$ is the optical power at a certain depth z away from the printing interface. The unit of depth z is μm. The unit of optical power is mW/cm². Po is the power at the curing interface. The curing interface is the resin The interface with fluorinated oil. Therefore the critical curing energy $E_c$ of the slice at z has:

$$E_c = \int_t^0 P(z)dt = \frac{E_o \cdot D_p}{v_m}(1 - e^{-v_m \cdot t/D_p}) \quad (16)$$

Under the premise of guaranteeing curability, the relationship between the rising speed $v_m$ of the printing platform for continuous printing and the maximum curable layer thickness z is:

$$Z = -D_p \cdot \ln\left(1 - \frac{E_c \cdot v_m}{E_o \cdot D_p}\right) \quad (17)$$

Determine the layer thickness of the slice to be printed according to the user's printing needs. Calculate the rising speed of the continuous printing platform according to formula (17). Write the rising speed of the continuous printing platform and the corresponding slice layer number into the printing configuration file.

Among them, according to the slice printing mode obtained in step 300, obtain slices printed in a layered manner Calculate the relationship between its resin leveling time and other control parameters. And according to Jacobs work curing curve to obtain the expression of layered resin curing time, and write the obtained control parameters into the printing configuration file. Step 500 includes:

Take the slices printed by layered molding obtained in step 300. The time for the resin to flow from $L_r$ to $D_{MAX}[i]$ is denoted as $t_2$. According to formula (12), there are:

$$\begin{cases} t_2 = \frac{D_{MAX}[i] - L_r}{u_{av}} = (D_{MAX}[i] - L_r)\frac{3\mu_1(H_s - D_s)}{H_s^2(H_s - 4D_s)}\left|\frac{dx}{dp}\right| \\ L_r \leq D_{MAX}[i] \end{cases} \quad (18)$$

The time T for layered printing resin filling is recorded as:

$$\begin{cases} T \approx t_1 + t_2 = T = \frac{H_s}{v_m} + (D_{MAX}[i] - L_r)\frac{3\mu_1}{H_s^2}\frac{(H_s - D_s)}{(H_s - 4D_s)}\left|\frac{dx}{dp}\right| \\ L_r \leq D_{MAX}[i] \end{cases} \quad (19)$$

According to formula (19), the slip length $D_s$ is much smaller than the lifting height $H_s$ of the printing platform. Therefore, it is considered that $(H_s - D_s)/(H_s - 4D_s)$ is a constant $C_3$ greater than 1. Then the relationship between the optimal lifting height of the printing platform and the resin filling time T corresponding to the minimum resin filling time of layered printing:

$$T \approx \frac{H_s}{v_m} + D_{MAX}[i]\frac{3\mu_1}{H_s^2}C_3\left|\frac{dx}{dp}\right| - \frac{H_s^2}{4v_m^2} \quad (20)$$

The $H_s$ obtained at this time is the optimal lifting height for layered printing;

The resin curing time model is established according to the Jacobs working curing curve:

$$C_d = D_p \cdot \ln\left(\frac{E_o}{E_c}\right) \quad (21)$$

where $C_d$ is the curing depth. $D_p$ is the transmission depth. $E_o$ is the light energy accumulated by the DLP light source at the curing interface. $E_c$ is the critical exposure for resin curing under UV light. The unit of curing depth and transmission depth is μm. The unit of light energy is mw/cm². The unit of critical exposure is mw/cm². Therefore, for slices with different layer thicknesses printed in layers, the curing time $t_3$ can be expressed as:

$$t_3 = \frac{E_c \cdot e^{\frac{C_d}{D_p}}}{E_o} \quad (22)$$

Determine the layer thickness of the slice to be printed according to the user's printing needs. Calculate the optimal lifting height of the layered molding printing platform according to the formula (20). According to this, you can also obtain the printing platform rising speed. Determine the curing time of the layered molding resin according to the formula (22). Write the optimal lifting height of the printing platform, the rising speed of the printing platform, the resin curing time and the corresponding slice layer number into the printing configuration file.

Further, before printing starts, use camera monitoring to determine the printing origin, and then complete the printing step 600 according to the printing configuration file, including:

Before printing, add fluorinated oil into the printing resin tank, and pour photosensitive resin on top. Place the light source under the resin tank. Because fluorinated oil is a colorless liquid, and photosensitive resin is a colored liquid. Monitor the printing origin on the side. Make sure that the printing platform is lowered to a slice layer thickness from the fluorinated oil interface;

Load the printing configuration files obtained in steps 400 and 500, and start model printing.

A rapid DLP 3D printing control parameter optimization method combining continuous and layered molding according to an embodiment of the present invention has the following advantages:

1) Using the proposed method, for DLP 3D printing based on liquid-liquid interface, by combining continuous and layered molding methods, a set of optimal control parameters can be quickly designed for different printing models;
2) Portability, the method of this patent can simulate the motion characteristics of the interface between resin and fluorinated oil. By setting different parameters, the real printing process can be approximated as much as possible. Simulation results such as resin filling time are obtained. At the same time, this method is not only applicable to liquid-liquid printing scenarios, but also to other slip interface DLP 3D printing scenarios by modifying the material represented by fluorinated oil and the boundary conditions of the contact surface with resin;
3) Printability, the combination of layered printing and continuous printing can be applied to most models. Therefore, the present invention has high theoretical significance and application value.

DETAILED DESCRIPTION

Hereinafter, the embodiments of the present invention will be described in detail with reference to the accompanying drawings. It should be noted that, the embodiments in the present application and the features in the embodiments may be arbitrarily combined with each other if there is no conflict.

The invention provides a rapid DLP 3D printing control parameter optimization method combining continuous and layered forming. The liquid-liquid interface printing scene is simulated by the VoF method, and the flow behavior of the resin between the printed object and the fluorinated oil after printing a layer of slices is recorded. Then, based on Poiseuille flow, Jacobs working curve and Lambert-Beer law, it is used to express the resin curing time of continuous and layered printing, the maximum filling distance of continuous printing, the best lifting distance of layered printing, and the corresponding printing of the two methods. These control parameters of the platform lifting speed. By adopting a proposed method for optimizing the control parameters of rapid DLP 3D printing that combines continuous and layered molding, rapid printing of any model can be achieved by obtaining the optimal control parameters.

Figure 1:
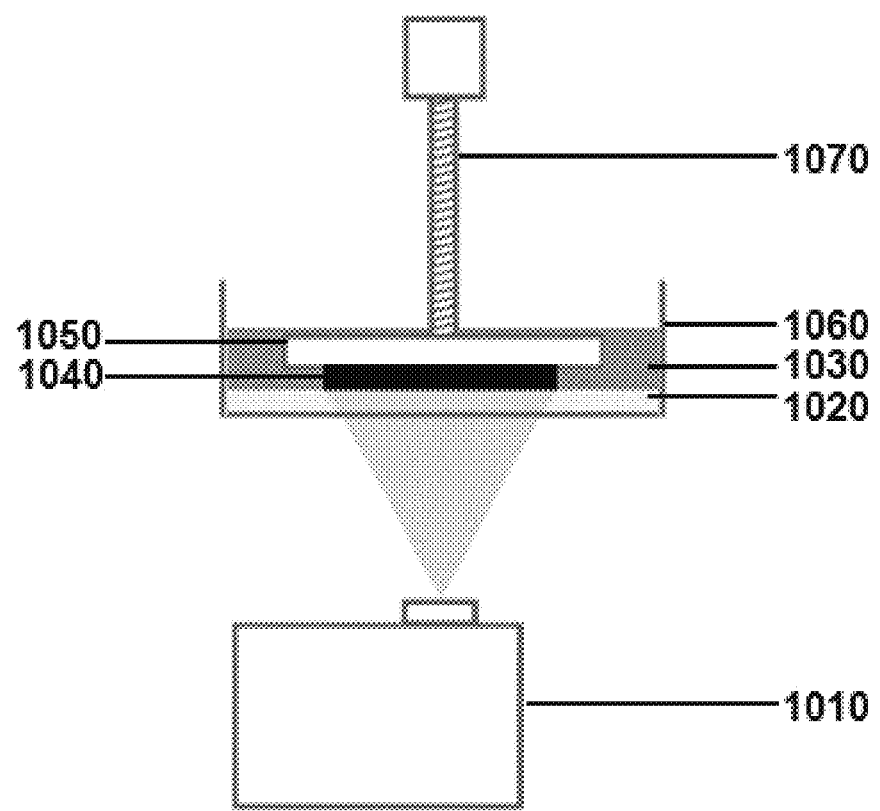
FIG. 1 is the composition principle of the device according to the embodiment of the present invention

DLP technology is considered to have the production efficiency that matches traditional manufacturing due to its faster printing speed. With the further increase in the demand for DLP 3D printing technology production. The layered printing method can no longer meet the requirements of the market for printing speed. A series of continuous forming technologies for DLP 3D printing have emerged in recent years. However, limited by the leveling speed of the photosensitive resin, the above methods are mostly used to print hollow models, and are difficult to apply to models with many large-sized solid slices. The method of the embodiment of the present invention has problems in continuous printing under the condition of ensuring model adaptation. A rapid DLP 3D printing control parameter optimization method combining continuous and layered forming is proposed to improve printing efficiency and adaptability to model slices of any size. FIG. 1 is a schematic diagram of the composition of the device applying the example of the present invention, including a DLP light source 1010, a resin tank 1060, a printing platform 1050 and a lead screw 1070, wherein the resin tank 1060 is located directly above the DLP light source 1010, and the DLP light source and the lead screw 1070 are respectively connected with Connect to the control host computer. The resin tank is filled with fluorinated oil 1020 and resin 1030 before printing starts. The DLP light source 1010 projects a two-dimensional slice of the model to be printed onto the interface between the fluorinated oil 1020 and the resin 1030 in the resin tank 1060. The resin is induced to change from a liquid state to a solid state by ultraviolet light, and is cured into a printing object 1040 and bonded to the printing platform 1050. The lead screw 1070 drives the printing platform to move. The resin flows into the gap between the cured layer and the fluorinated oil. After that, the above steps are repeated until the curing of the printed model is finally completed.

Figure 2:
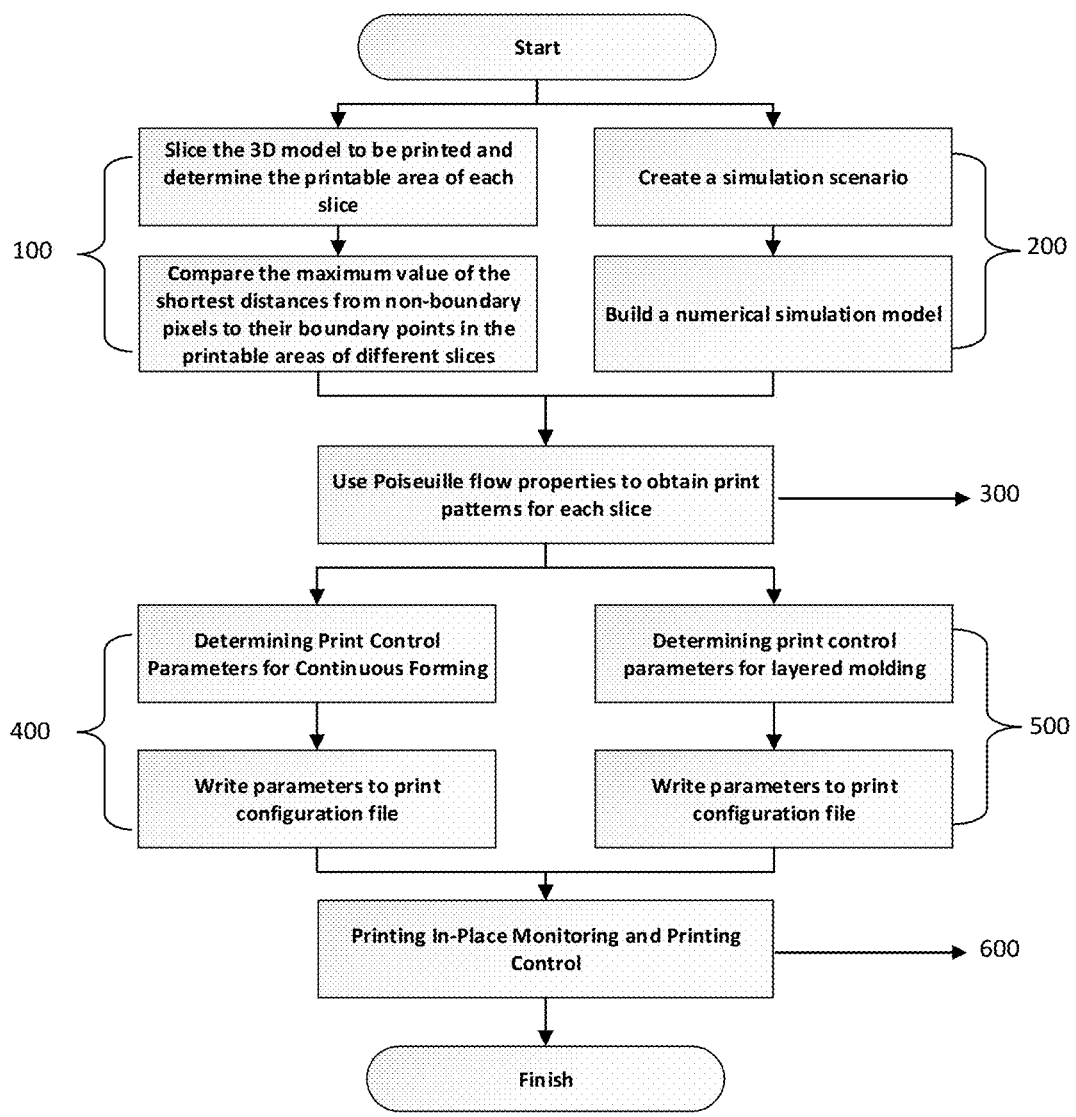
FIG. 2 is a flowchart of a method for optimizing control parameters of rapid DLP 3D printing combining continuous and layered molding according to an embodiment of the present invention.

FIG. 2 is a flowchart of a method for optimizing control parameters of rapid DLP 3D printing combining continuous and layered molding according to an embodiment of the present invention.

The embodiment of the present invention proposes a method for optimizing the control parameters of rapid DLP 3D printing combining continuous and layered molding, including:

Step 100: Slice the three-dimensional model to be printed to obtain the slice number i. Determine the printable area of each slice, and calculate the maximum value $D_{MAX}[i]$ of the shortest distances from all points in the printable area of each slice to its boundary points;

Step 200: Based on the standard solver of the open source computational fluid dynamics (CFD) software OpenFOAM. And according to the liquid-liquid two-phase flow printing scene of resin-fluorinated oil, the VoF model is used to establish a numerical simulation model;

Step 300: Establish a Cartesian coordinate system according to the printing scene. According to the $D_{MAX}[i]$ obtained in step 100 and the numerical simulation model established in step 200, the Poiseuille flow characteristic analysis is used to obtain the print mode of each slice;

Step 400, according to the slice printing mode obtained in step 300, obtain slices printed in a continuous manner Calculate the rising speed of the continuous forming printing platform according to the Lambert-Beer law and write it into the printing configuration file;

Step 500: According to the slice printing mode obtained in step 300, obtain slices printed in a layered manner Calculate the relationship between its resin leveling time and other control parameters. And according to Jacobs work curing curve to obtain the expression of layered resin curing time, and write the obtained control parameters into the printing configuration file;

Step 600: Before printing starts, use camera monitoring to determine the printing origin, and then complete the printing according to the printing configuration file.

Wherein, the processing step 100 includes:

Sub-step 110, slice the three-dimensional model to be printed, and at this time, only the pixel points with a grayscale of 255 are the pixels to be exposed. Take the area with a grayscale value of 255, which is the printable area of the slice.

Sub-step 120, detect the printable areas of different slices. Determine the four points of the upper left, lower left, upper right and lower right corners. Connect them as a closed area S. At the same time, obtain the non-edge points that are closest to the center of the printable area. Pixel point. Record these distance values and compare them to obtain the maximum value $D_{MAX}[i]$ of the minimum distance corresponding to different slice i respectively.

Figure 3:
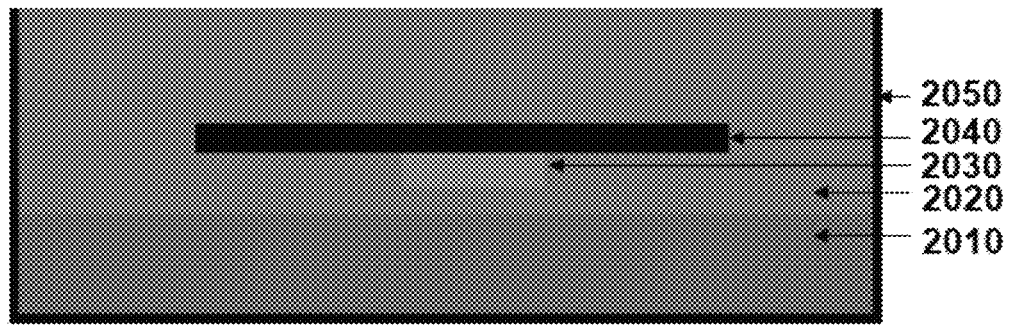
FIG. 3 is a schematic diagram of a liquid-liquid two-phase flow printing scenario for an embodiment of the present invention.

Further, step 200 includes:

Sub-step 210, according to the standard solver of the open source CFD software OpenFOAM. And adopt the VoF model. The liquid-liquid two-phase flow printing scene shown in FIG. 3 is established. Liquid-liquid two-phase flow printing scene including fluorinated oil 2010, resin 2020, printing object 2030, printing platform 2040 and resin tank 2050.

Sub-step 220, set the resin tank, printing platform and printing object to rigid material. The boundary of the resin tank in contact with the fluorinated oil and resin is set to the solid wall boundary. The printing platform, the surface of the printing object in contact with the resin and fluorinated oil is set to linear Slip boundary. No-slip boundary between resin and fluorinated oil.

Figure 4:
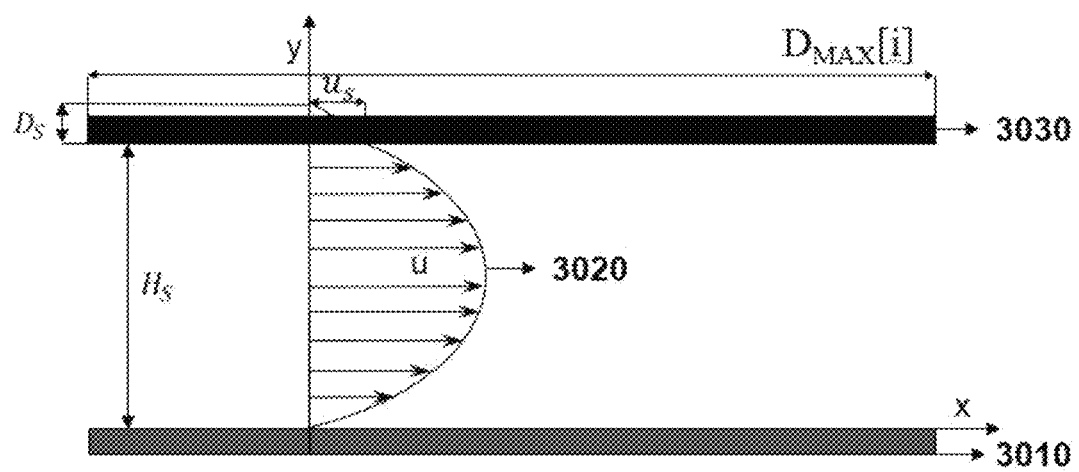
FIG. 4 is a schematic diagram of resin flow according to an embodiment of the present invention.

Further, step 300 includes:

Sub-step 310, the resin has the same flow characteristics in any direction in the printing model and the fluorinated oil gap. According to the printing scene, the resin flow Cartesian coordinate system as shown in FIG. 4 is established, 3010 is fluorinated oil, 3020 is resin, and 3030 is printing object.

Sub-step 320, the resin flows in the gap between the printing model and the fluorinated oil, and its Reynolds number is less than 1. It conforms to the laminar flow motion law between the plates and conforms to the Poiseuille flow. There are N-S equations:

$$\frac{d^2u}{dy^2} = \frac{1}{\mu_1}\frac{dp}{dx} \quad (1)$$

The origin of y is the interface between the fluorinated oil and the resin, indicating the distance from the interface. The origin of x is the interface between the fluorinated oil and the resin perpendicular to the edge of the printed object, indicating the distance of resin filling. At the same time, there is a boundary condition:

$$u|_{y=H_s}=u_s, \; u|_{y=0}=0 \quad (2)$$

where u is the maximum speed of the resin moving in the x-axis. $u_s$ is the slip speed. $H_s$ is the height of the printing platform. dp/dx is the pressure gradient. $\mu_1$ is the viscosity of the resin. The integral of formula (1) is:

$$u = \frac{1}{2\mu_1}\frac{dp}{dx}y^2 + C_1 y + C_2 \quad (3)$$

Here $C_1$ and $C_2$ are constants. By substituting the boundary condition equation (3) into equation (1), then can get:

$$C_1 = \frac{u_s}{H_s} - \frac{1}{2\mu_1}\frac{dp}{dx}H_s \quad (4)$$

$$C_2 = 0 \quad (5)$$

$$u = \frac{1}{2\mu_1}\frac{dp}{dx}(y^2 - H_s \times y) + \frac{u_s}{H_s}y \quad (6)$$

According to the linear slip settings of the scene, it can get:

$$u_s = D_s \frac{du}{dy}\Big|_{y=H_s} \quad (7)$$

Where $D_s$ is the slip length, according to formula (1) (4) (7) can be obtained:

$$u_s = \frac{1}{2\mu_1}\frac{H_s^2 D_s}{H_s - D_s}\frac{dp}{dx} \quad (8)$$

$$u = \frac{1}{2\mu_1}\frac{dp}{dx}\left(y^2 + \frac{2H_s D_s - H_s^2}{H_s - D_s}y\right) \quad (9)$$

According to formula (9), the volume flow Q between the printing model with width W and the fluorinated oil can be obtained as:

$$Q = W \int_0^{H_s} u\,dy = \frac{WH_s^3(4D_s - H_s)}{12\mu_1(H_s - D_s)} \frac{dp}{dx} \qquad (10)$$

Then the average flow rate of the photosensitive resin is:

$$U_{av} = \frac{Q}{WH_s} = \frac{H_s^2(4D_s - H_s)}{12\mu_1(H_s - D_s)} \frac{dp}{dx} \qquad (11)$$

At time $t_1$ when the platform rises, there is a relationship between the resin filling distance $L_r$ and the time variable t in one direction:

$$\begin{cases} L_r = \int_{t=0}^{\tau=t_1} \frac{H_s^2(4D_s - H_s)}{12\mu_1(H_s - D_s)} \frac{dp}{dx} * t\,dt \\ H_s = v_m * t \end{cases} \qquad (12)$$

$v_m$ is the speed of the printing platform during the rising process. $t_1$ is the resin filling time when the filling distance is $L_r$. This is the continuous printing resin filling time;

Sub-step 330, the boundary between continuous printing and layered printing needs to determine the maximum filling distance of the continuous printing resin. This distance needs to be less than $D_{MAX}[i]$. Then the gap left after the printing platform is raised within the time $1/f_n$ of single-frame playback needs to be supplemented Completely. At the same time, it is ensured that the resin filling the gap can be completely cured before the next frame of image is played. And the printing platform rises slowly in continuous printing. The combination formula (12) has:

$$\begin{cases} D_{MAX}[i]' = \int_{t=0}^{\tau=\frac{1}{f_n}} \frac{H_s^2(4D_s - H_s)}{12\mu_1(H_s - D_s)} \frac{dp}{dx} * t\,dt \\ H_s = v_m * \frac{1}{f_n} \end{cases} \qquad (13)$$

The maximum filling distance of continuous printing resin can be obtained, the corresponding $D_{MAX}[i]'$:

$$D_{MAX}[i]' = \frac{v_m^2}{f_n^4} \cdot \frac{1}{C_3} \cdot \frac{1}{24\mu_1} \left|\frac{dp}{dx}\right| \qquad (14)$$

Figure 5:
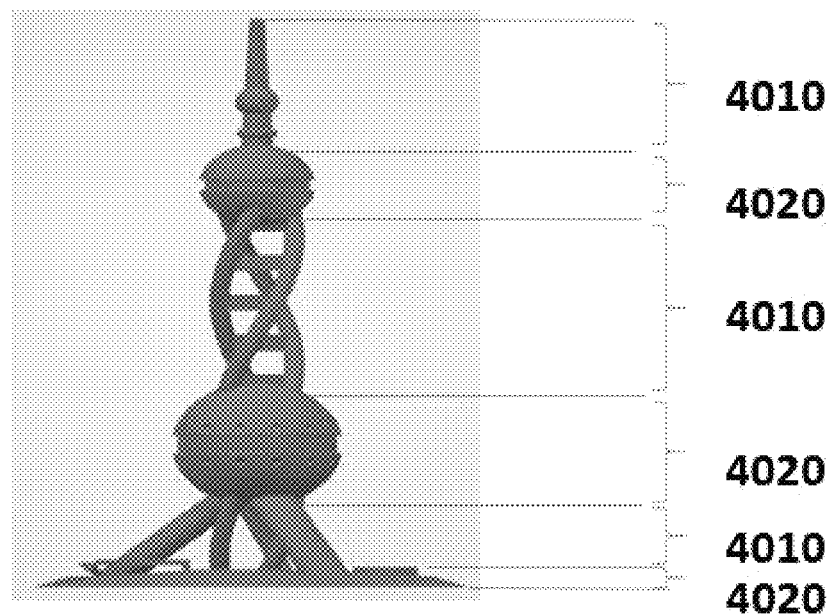
FIG. 5 shows a schematic representation of the layered and continuous regions of the tower model.

Therefore, if the slice's $D_{MAX}[i] > D_{MAX}[i]'$, the slice is printed by layered molding. If the slice's $D_{MAX}[i] \le D_{MAX}[i]'$, it is printed by continuous molding. FIG. 5 shows the results of the layered and continuous confirmation of the tower model, in which 3010 is the continuous forming and printing slice layer, and 3020 is the layered forming and printing slice layer.

Among them, continuous molding and layered molding are defined as follows:

Continuous molding, that is, the surface exposure printer continues to rise without stopping and does not fall, and it takes a short time to print one layer, which is suitable for slicing layers with small $D_{MAX}[i]$. Layered molding means printing a layer of images with a light source with a grayscale of 0. At this time, the printing platform first rises and then falls. At this time, the photosensitive resin has been fully leveled, which is suitable for slice layers with large $D_{MAX}[i]$.

The step 400 includes:

Sub-step 410, taking the slices of continuous molding and printing obtained in step 300, according to the Lambert-Beer law:

$$P(z) = P_0 \cdot e^{-z/D_p} \qquad (15)$$

where P(z) is the optical power at a certain depth z away from the printing interface. The unit of depth z is μm. The unit of optical power is mW/cm². Po is the power at the curing interface. The curing interface is the resin The interface with fluorinated oil. Therefore the critical curing energy $E_c$ of the slice at z has:

$$E_c = \int_t^0 P(z)\,dt = \frac{E_o \cdot D_p}{v_m}(1 - e^{-v_m \cdot t / D_p}) \qquad (16)$$

Under the premise of guaranteeing curability, the relationship between the rising speed $v_m$ of the printing platform for continuous printing and the maximum curable layer thickness z is:

$$Z = -D_p \cdot \ln\left(1 - \frac{E_c \cdot v_m}{E_o \cdot D_p}\right) \qquad (17)$$

Sub-step 420, determine the layer thickness of the slice to be printed according to the user's printing needs. Calculate the rising speed of the continuous printing platform according to formula (17). Write the rising speed of the continuous printing platform and the corresponding slice layer number into the printing configuration file.

The step 500 includes:

Sub-step 510, take the slices printed by layered molding obtained in step 300. The time for the resin to flow from $L_r$ to $D_{MAX}[i]$ is denoted as $t_2$. According to formula (12), there are:

$$\begin{cases} t_2 = \frac{D_{MAX}[i] - L_r}{u_{av}} = (D_{MAX}[i] - L_r) \frac{3\mu_1(H_s - D_s)}{H_s^2(H_s - 4D_s)} \left|\frac{dx}{dp}\right| \\ L_r \le D_{MAX}[i] \end{cases} \qquad (18)$$

The time T for layered printing resin filling is recorded as:

$$\begin{cases} T \approx t_1 + t_2 = T = \frac{H_s}{v_m} + (D_{MAX}[i] - L_r)\frac{3\mu_1}{H_s^2}\frac{(H_s - D_s)}{(H_s - 4D_s)}\left|\frac{dx}{dp}\right| \\ L_r \le D_{MAX}[i] \end{cases} \qquad (19)$$

According to formula (19), the slip length $D_s$ is much smaller than the lifting height $H_s$ of the printing platform. Therefore, it is considered that $(H_s - D_s)/(H_s - 4D_s)$ is a constant $C_3$ greater than 1. Then the relationship between the optimal lifting height of the printing platform and the resin filling time T corresponding to the minimum resin filling time of layered printing:

$$T \approx \frac{H_s}{v_m} + D_{MAX}[i]\frac{3\mu_1}{H_s^2}C_3\left|\frac{dx}{dp}\right| - \frac{H_s^2}{4v_m^2} \qquad (20)$$

The $H_s$ obtained at this time is the optimal lifting height for layered printing.

Sub-step 520, The resin curing time model is established according to the Jacobs working curing curve:

$$C_d = D_p \cdot \ln\left(\frac{E_o}{E_c}\right) \quad (21)$$

where $C_d$ is the curing depth. $D_p$ is the transmission depth. $E_o$ is the light energy accumulated by the DLP light source at the curing interface. $E_c$ is the critical exposure for resin curing under UV light. The unit of curing depth and transmission depth is μm. The unit of light energy is mw/cm². The unit of critical exposure is mw/cm². Therefore, for slices with different layer thicknesses printed in layers, the curing time $t_3$ can be expressed as:

$$t_3 = \frac{E_c \cdot e^{\frac{C_d}{D_p}}}{E_o} \quad (22)$$

Sub-step 530, determine the layer thickness of the slice to be printed according to the user's printing needs. Calculate the optimal lifting height of the layered molding printing platform according to the formula (20). According to this, you can also obtain the printing platform rising speed. Determine the curing time of the layered molding resin according to the formula (22). Write the optimal lifting height of the printing platform, the rising speed of the printing platform, the resin curing time and the corresponding slice layer number into the printing configuration file.

The step 600 includes:

Sub-step 610, before printing, add fluorinated oil into the printing resin tank, and pour photosensitive resin on top. Place the light source under the resin tank. Because fluorinated oil is a colorless liquid, and photosensitive resin is a colored liquid. Monitor the printing origin on the side. Make sure that the printing platform is lowered to a slice layer thickness from the fluorinated oil interface;

Sub-step 620, load the printing configuration files obtained in steps 400 and 500, and start model printing.

A rapid DLP 3D printing control parameter optimization method combining continuous and layered molding according to an embodiment of the present invention has the following advantages:

1) Using the proposed method, for DLP 3D printing based on liquid-liquid interface, by combining continuous and layered molding methods, a set of optimal control parameters can be quickly designed for different printing models;

2) Portability, the method of this patent can simulate the motion characteristics of the interface between resin and fluorinated oil. By setting different parameters, the real printing process can be approximated as much as possible. Simulation results such as resin filling time are obtained. At the same time, this method is not only applicable to liquid-liquid printing scenarios, but also to other slip interface DLP 3D printing scenarios by modifying the material represented by fluorinated oil and the boundary conditions of the contact surface with resin;

3) Printability, the combination of layered printing and continuous printing can be applied to most models. Therefore, the present invention has high theoretical significance and application value.

We claim:

1. A rapid DLP 3D printing control parameter optimization method combining continuous and layered molding, comprising the following steps:

Step 100: slice a three-dimensional model to be printed to obtain a slice number i, determine a printable area of each slice, and calculate a maximum value $D_{MAX}[i]$ of shortest distances from all points in the printable area of each slice to its boundary points;

Step 200: based on a standard solver of an open source computational fluid dynamics (CFD) software Open-FOAM, and according to liquid-liquid two-phase flow printing scene of resin-fluorinated oil, a VoF model is used to establish a numerical simulation model;

Step 300: establish a Cartesian coordinate system according to the printing scene, according to the $D_{MAX}[i]$ obtained in step 100 and the numerical simulation model established in step 200, Poiseuille flow characteristic analysis is used to obtain a print mode of each slice;

Step 400, according to the slice printing mode obtained in step 300, obtain slices printed in a continuous manner, calculate a rising speed of a continuous forming printing platform according to the Lambert-Beer law and write it into a printing configuration file;

Step 500: according to the slice printing mode obtained in step 300, obtain slices printed in a layered manner, calculate a relationship between its resin leveling time and other control parameters, and according to Jacobs work curing curve to obtain an expression of layered resin curing time, and write the obtained control parameters into the printing configuration file;

Step 600: before printing starts, use camera monitoring to determine a printing origin, and then complete the printing according to the printing configuration file.

2. The method of claim 1, wherein step 100 is as follows:
   slice the three-dimensional model to be printed, and at this time, only pixel points with a grayscale of 255 are pixels to be exposed, take an area with a grayscale value of 255, which is the printable area of the slice;
   detect the printable areas of different slices, determine four points of upper left, lower left, upper right and lower right corners, connect them as a closed area S; at the same time, obtain non-edge points that are closest to a center of the printable area; pixel point, record these distance values and compare them to obtain the maximum value $D_{MAX}[i]$ of the minimum distance corresponding to different slice i respectively.

3. The method of claim 1, wherein step 200 is as follows:
   according to the standard solver of the open source CFD software OpenFOAM, and adopt the VoF model to establish a liquid-liquid two-phase flow printing scene including resin tank, printing platform, printing object, resin and fluorinated oil;
   at the same time, set the resin tank, printing platform and printing object to rigid material, a boundary of the resin tank in contact with the fluorinated oil and resin is set to a solid wall boundary, the printing platform, the surface of the printing object in contact with the resin and fluorinated oil is set to linear slip boundary, no-slip boundary between resin and fluorinated oil.

4. The method of claim 1, wherein step 300 is as follows:
   the resin has the same flow characteristics in any direction in the printing model and the fluorinated oil gap, and a Cartesian coordinate system is established according to the printing scene;
   the resin flows in the gap between the printing model and the fluorinated oil, and its Reynolds number is less than 1, it conforms to the laminar flow motion law between plates and conforms to the Poiseuille flow, there are N-S equations:

$$\frac{d^2u}{dy^2} = \frac{1}{\mu_1}\frac{dp}{dx} \quad (1)$$

an origin of y is the interface between the fluorinated oil and the resin, indicating a distance from the interface, an origin of x is the interface between the fluorinated oil and the resin perpendicular to the edge of the printed object, indicating a distance of resin filling, at the same time, there is a boundary condition:

$$u|_{y=H_s}=u_s, \ u|_{y=0}=0 \quad (2)$$

where u is the maximum speed of the resin moving in the x-axis, $u_s$ is the slip speed, $H_s$ is the height of the printing platform, dp/dx is the pressure gradient, $\mu_1$ is the viscosity of the resin, the integral of formula (1) is:

$$u = \frac{1}{2\mu_1}\frac{dp}{dx}y^2 + C_1 y + C_2 \quad (3)$$

where $C_1$ and $C_2$ are constants, by substituting the boundary condition equation (3) into equation (1), then can get:

$$C_1 = \frac{u_s}{H_s} - \frac{1}{2\mu_1}\frac{dp}{dx}H_s \quad (4)$$

$$C_2 = 0 \quad (5)$$

$$u = \frac{1}{2\mu_1}\frac{dp}{dx}(y^2 - H_s \times y) + \frac{u_s}{H_s}y \quad (6)$$

according to linear slip settings of the scene, it can get:

$$u_s = D_s \frac{du}{dy}|_{y=H_s} \quad (7)$$

where $D_s$ is the slip length, according to formula (1) (4) (7) it can be obtained:

$$u_s = \frac{1}{2\mu_1}\frac{H_s^2 D_s}{H_s - D_s}\frac{dp}{dx} \quad (8)$$

$$u = \frac{1}{2\mu_1}\frac{dp}{dx}\left(y^2 + \frac{2H_s D_s - H_s^2}{H_s - D_s}y\right) \quad (9)$$

is according to formula (9), volume flow Q between the printing model with width W and the fluorinated oil can be obtained as:

$$Q = W\int_0^{H_s} u\,dy = \frac{WH_s^3(4D_s - H_s)}{12\mu_1(H_s - D_s)}\frac{dp}{dx} \quad (10)$$

then the average flow rate of the photosensitive resin is:

$$U_{av} = \frac{Q}{WH_s} = \frac{H_s^2(4D_s - H_s)}{12\mu_1(H_s - D_s)}\frac{dp}{dx} \quad (11)$$

at time $t_1$ when the platform rises, there is a relationship between the resin filling distance $L_r$ and the time variable t in one direction:

$$\begin{cases} L_r = \int_{t=0}^{t=t_1} \frac{H_s^2(4D_s - H_s)}{12\mu_1(H_s - D_s)}\frac{dp}{dx} * t\,dt \\ H_s = v_m * t \end{cases} \quad (12)$$

$v_m$ is the speed of the printing platform during the rising process, $t_1$ is the resin filling time when the filling distance is $L_r$, this is the continuous printing resin filling time;

the boundary between continuous printing and layered printing needs to determine the maximum filling distance of the continuous printing resin, this distance needs to be less than $D_{MAX}[i]$, then the gap left after the printing platform is raised within the time $1/f_n$ of single-frame playback needs to be supplemented completely, at the same time, it is ensured that the resin filling the gap can be completely cured before the next frame of image is played; and the printing platform rises slowly in continuous printing, the combination formula (12) has:

$$\begin{cases} D_{MAX}[i]' = \int_{t=0}^{t=\frac{1}{f_n}} \frac{H_s^2(4D_s - H_s)}{12\mu_1(H_s - D_s)}\frac{dp}{dx} * t\,dt \\ H_s = v_m * \frac{1}{f_n} \end{cases} \quad (13)$$

the maximum filling distance of continuous printing resin can be obtained, the corresponding $D_{MAX}[i]'$:

$$D_{MAX}[i]' = \frac{v_m^2}{f_n^4} \cdot \frac{1}{C_3} \cdot \frac{1}{24\mu_1}\left|\frac{dp}{dx}\right| \quad (14)$$

therefore, if the slice's $D_{MAX}[i] > D_{MAX}[i]'$, the slice is printed by layered molding; if the slice's $D_{MAX}[i] \leq D_{MAX}[i]'$, it is printed by continuous molding.

5. The method of claim 1, wherein step 400 is as follows: taking the slices of continuous molding and printing obtained in step 300, according to the Lambert-Beer law:

$$P(z) = P_0 \cdot e^{-z/D_p} \quad (15)$$

where P(z) is the optical power at a certain depth z away from the printing interface, the unit of depth z is μm, the unit of optical power is mW/cm², Po is the power at the curing interface, the curing interface is the resin interface with fluorinated oil, therefore the critical curing energy $E_c$ of the slice at z has:

$$E_c = \int_t^0 P(z)dt = \frac{E_o \cdot D_p}{v_m}(1 - e^{-v_m \cdot t / D_p}) \qquad (16)$$

under the premise of guaranteeing curability, the relationship between the rising speed $v_m$ of the printing platform for continuous printing and the maximum curable layer thickness z is:

$$Z = -D_p \cdot \ln\left(1 - \frac{E_c \cdot v_m}{E_o \cdot D_p}\right) \qquad (17)$$

determine the layer thickness of the slice to be printed according to the user's printing needs, calculate the rising speed of the continuous printing platform according to formula (17), write the rising speed of the continuous printing platform and the corresponding slice layer number into the printing configuration file.

6. The method of claim 1, wherein step 500 is as follows: take the slices printed by layered molding obtained in step 300, the time for the resin to flow from $L_r$ to $D_{MAX}[i]$ is denoted as $t_2$, according to formula (12), there are:

$$\begin{cases} t_2 = \frac{D_{MAX}[i] - L_r}{u_{av}} = (D_{MAX}[i] - L_r)\frac{3\mu_1(H_s - D_s)}{H_s^2(H_s - 4D_s)}\left|\frac{dx}{dp}\right| \\ L_r \le D_{MAX}[i] \end{cases} \qquad (18)$$

time T for layered printing resin filling is recorded as:

$$\begin{cases} T \approx t_1 + t_2 = T = \frac{H_s}{v_m} + (D_{MAX}[i] - L_r)\frac{3\mu_1}{H_s^2}\frac{(H_s - D_s)}{(H_s - 4D_s)}\left|\frac{dx}{dp}\right| \\ L_r \le D_{MAX}[i] \end{cases} \qquad (19)$$

according to formula (19), the slip length $D_s$ is much smaller than the lifting height $H_s$ of the printing platform, therefore, it is considered that $(H_s - D_s)/(H_s - 4D_s)$ is a constant $C_3$ greater than 1; then the relationship between the optimal lifting height of the printing platform and the resin filling time T corresponding to the minimum resin filling time of layered printing:

$$T \approx \frac{H_s}{v_m} + D_{MAX}[i]\frac{3\mu_1}{H_s^2}C_3\left|\frac{dx}{dp}\right| - \frac{H_s^2}{4v_m^2} \qquad (20)$$

$H_s$ obtained at this time is an optimal lifting height for layered printing;

the resin curing time model is established according to the Jacobs working curing curve:

$$C_d = D_p \cdot \ln\left(\frac{E_o}{E_c}\right) \qquad (21)$$

where $C_d$ is the curing depth, $D_p$ is the transmission depth, $E_o$ is the light energy accumulated by the DLP light source at the curing interface, $E_c$ is the critical exposure for resin curing under UV light, the unit of the curing depth and the transmission depth is μm, the unit of the light energy is mw/cm$^2$, the unit of the critical exposure is mw/cm$^2$; therefore, for slices with different layer thicknesses printed in layers, the curing time $t_3$ can be expressed as:

$$t_3 = \frac{E_c \cdot e^{\frac{C_d}{D_p}}}{E_o} \qquad (22)$$

determine the layer thickness of the slice to be printed according to the user's printing needs, calculate the optimal lifting height of the layered molding printing platform according to the formula (20), according to this, one can also obtain the printing platform rising speed; determine the curing time of the layered molding resin according to the formula (22), write the optimal lifting height of the printing platform, the rising speed of the printing platform, the resin curing time and the corresponding slice layer number into the printing configuration file.

7. The method of claim 1, wherein step 600 is as follows:

before printing, add fluorinated oil into the printing resin tank, and pour photosensitive resin on top, place the light source under the resin tank; because fluorinated oil is a colorless liquid, and photosensitive resin is a colored liquid, monitor the printing origin on the side, make sure that the printing platform is lowered to a slice layer thickness from the fluorinated oil interface; load the printing configuration files obtained in steps 400 and 500, and start model printing.

\* \* \* \* \*